（12） United States Patent
Noda et al.

(10) Patent No.: US 9,430,698 B2
(45) Date of Patent: *Aug. 30, 2016

(54) INFORMATION INPUT APPARATUS, INFORMATION INPUT METHOD, AND COMPUTER PROGRAM

(71) Applicant: SONY CORPORATION, Tokyo (JP)

(72) Inventors: Kuniaki Noda, Tokyo (JP); Hirotaka Suzuki, Kanagawa (JP); Haruto Takeda, Tokyo (JP); Yusuke Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,168

(22) Filed: May 29, 2015

(65) Prior Publication Data

US 2015/0262004 A1 Sep. 17, 2015

Related U.S. Application Data

(63) Continuation of application No. 13/766,056, filed on Feb. 13, 2013, now Pat. No. 9,075,444.

(30) Foreign Application Priority Data

Mar. 27, 2012 (JP) ................................. 2012-072392

(51) Int. Cl.
*G06F 3/048* (2013.01)
*G06K 9/00* (2006.01)
*G06F 3/01* (2006.01)
*G06K 9/62* (2006.01)
*G06T 7/00* (2006.01)

(52) U.S. Cl.
CPC ........... *G06K 9/00355* (2013.01); *G06F 3/017* (2013.01); *G06K 9/00389* (2013.01); *G06K 9/6202* (2013.01); *G06K 9/6269* (2013.01); *G06T 7/0081* (2013.01)

(58) Field of Classification Search
CPC .............................. G06F 3/017; G06K 9/6202
See application file for complete search history.

(56) References Cited

U.S. PATENT DOCUMENTS

2011/0032423 A1* 2/2011 Jing ....................... H04L 12/282
348/552
2011/0170742 A1* 7/2011 Fukuchi ............... H04N 5/4403
382/103
2011/0211754 A1* 9/2011 Litvak ................. G06K 9/00375
382/165

* cited by examiner

*Primary Examiner* — Dwayne Bost
*Assistant Examiner* — Sepehr Azari
(74) *Attorney, Agent, or Firm* — Chip Law Group

(57) ABSTRACT

An information input apparatus includes an observation unit that observes an environment including a user and one or more apparatuses to be controlled and includes a sensor; a learning unit that separates a foreground including the user and the one or more apparatuses to be controlled and a background including the environment except for the foreground from observation data obtained by the observation unit and learns three-dimensional models of the foreground and the background; a state estimation unit that estimates positions and postures of already modeled foregrounds in the environment; a user recognition unit that identifies fingers of the user from the foreground and recognizes a shape, position, and posture of the fingers; and an apparatus control unit that outputs a control command to the one or more apparatuses to be controlled on the basis of the recognized shape, position, and posture of the fingers.

20 Claims, 12 Drawing Sheets

FIG. 5

| SHAPE OF HAND 1 (LEFT HAND) | 1 | 2 | 3 | 4 | 5 | 6 |
|---|---|---|---|---|---|---|
| TELEVISION | SELECT ICON, OK | POWER ON, MOVE CURSOR | — | RETURN, CANCEL | POWER OFF | — |
| MUSIC PLAYBACK SYSTEM | — | POWER ON, IDENTIFY APPARATUS | — | — | POWER OFF | — |
| LIGHT | — | POWER ON, IDENTIFY APPARATUS | — | — | POWER OFF | — |
| POT | — | POWER ON | — | — | POWER OFF | — |

| SHAPE OF HAND 2 (RIGHT HAND) | 1 | 2 | 3 | 4 | 5 | 6 |
|---|---|---|---|---|---|---|
| TELEVISION | CHANGE CHANNEL (GESTURE) | ADJUST VOLUME (GESTURE) | — | — | — | CHANGE INPUT (GESTURE) |
| MUSIC PLAYBACK SYSTEM | CHANGE SOUND SOURCE (GESTURE) | ADJUST VOLUME (GESTURE) | PLAY BACK | — | STOP | FAST FORWARD/ REWIND (GESTURE) |
| LIGHT | — | ADJUST LIGHT QUANTITY (GESTURE) | — | — | — | — |
| POT | — | — | — | — | — | — |

INFORMATION INPUT APPARATUS, INFORMATION INPUT METHOD, AND COMPUTER PROGRAM

CROSS-REFERENCE TO RELATED APPLICATION

The present application is a continuation of U.S. patent application Ser. No. 13/766,056 filed on Feb. 13, 2013 which claims priority from Japanese Patent Application No. JP 2012-072392 filed in the Japanese Patent Office on Mar. 27, 2012, the entire content of which is incorporated herein by reference.

BACKGROUND

The present disclosure relates to an information input apparatus, information input method, and computer program for inputting a control command issued by a user to an apparatus to be controlled. In particular, the present disclosure relates to an information input apparatus, information input method, and computer program for inputting a control command issued by a user, such as a gesture of a hand.

In the environment where humans live, there are various types of products controlled by the user, such as home electrical appliances and information devices. There have been existing technologies configured to remotely control these types of apparatuses using a device, such as a laser pointer or remote control.

For example, there have been proposed remote control position notification systems that can notify the user of the position of a remote control (for example, see Japanese Unexamined Patent Application Publication No. 2008-224584), pointing systems that when the user waves, with a hand, a pointing device which is emitting a high-luminance diffusion light beam from its center, detect the position of the pointing device using multiple light receiving sensors, and display a pointer on the screen in accordance with motions of the hand while moving the pointer vertically or horizontally (for example, see Japanese Unexamined Patent Application Publication No. 2009-301564), and the like. However, in these related technologies, the user has to operate, with his or her fingers, a particular device for generating a signal for detecting the position or posture of the fingers, such as a remote control.

There have been also proposed remote controls configured to capture an image of an operator who is operating operation display means for displaying an operation button or menu and to detect an operation performed by the user on the basis of the shape and motion of a hand area detected from the captured image and the display on the operation display means (for example, see Japanese Unexamined Patent Application Publication No. 2010-79332). This related technology can recognize a gesture of the user using the outline of his or her fingers. However, since this technology uses only two-dimensional outline information, it is difficult to recognize a gesture stably unless the posture of the fingers is appropriate to the camera. For this reason, the user has to be conscious of the position of the camera. This imposes a large restriction on the posture of the user which is performing an operation. When the direction of observing the shape of the fingers, or the like, is changed, the outline of the fingers significantly changes. Accordingly, when a gesture is recognized in accordance with the outline, the recognition result becomes unstable, depending on the observation direction.

There have been also proposed image recognition apparatuses which three-dimensionally read a motion of the operator relative to a virtual operation surface, determine whether the motion is an operation, on the basis of the positional relationship between part of the operator and the virtual operation surface, and when the operator makes a motion in any of two or more virtual operation layers defined on the basis of this positional relationship, determine details of the operation on the basis of an operation type previously allocated to this virtual operation layer and the motion of the operator in this virtual operation layer (for example, see Japanese Unexamined Patent Application Publication No. 2010-15553). These image recognition apparatuses three-dimensionally track the fingers of the user using an image feature value. However, for example, when the lighting conditions are abruptly changed, it is difficult to stably match and track feature points among multiple frames in an image. Accordingly, the image recognition apparatuses seem to be low in recognition stability. Further, while these image recognition apparatuses can measure the three-dimensional positions of the feature points of the fingers, they do not detect the posture of the fingers themselves. Further, since these image recognition apparatuses recognize the user at a position relative to the camera, the user has to be conscious of the position of the camera. Further, to allow the user to perform an intuitive operation, the position of the camera has to be determined based on the relative positional relationship between the camera and the screen. Accordingly, the degree of freedom of choice is low.

There have been also proposed human motion determination apparatuses configured to use a captured image of a human which is making a predetermined motion and also use information on the depth of the captured image to determine the motion of the human, to extract feature points from the captured image to calculate a three-dimensional feature value, to track this three-dimensional feature value to calculate a four-dimensional trajectory feature value, and to use the four-dimensional trajectory feature value to determine the motion for each unit tracking time (for example, see Japanese Unexamined Patent Application Publication No. 2012-3364). However, to input an operation to these apparatuses, the user has to perform an operation on a virtual operation surface associated with a position indicated by a marker. Accordingly, a restriction is imposed on the position or posture of the user which is performing an operation.

SUMMARY

It is desirable to provide an excellent information input apparatus, information input method, and computer program which can input a control command to an apparatus to be controlled on the basis of an intuitive motion made by the user, such as a gesture of a hand.

According to an embodiment of the present disclosure, there is provided an information input apparatus. The information input apparatus includes an observation unit configured to observe an environment including a user and one or more apparatuses to be controlled, the observation unit including a sensor; a learning unit configured to separate a foreground and a background from observation data obtained by the observation unit, the foreground including the user and the one or more apparatuses to be controlled, the background including the environment except for the foreground, and to learn three-dimensional models of the foreground and the background; a state estimation unit configured to estimate positions and postures of already modeled foregrounds in the environment; a user recognition unit configured to identify fingers of the user from the foreground and to recognize a shape, position, and posture of the fingers; and an apparatus control unit configured to output a control command to the one or more apparatuses to be controlled on the basis of the shape, position, and posture of the fingers recognized by the user recognition unit.

In the information input apparatus according to the embodiment of the present disclosure, the observation unit may obtain a range image of the environment, and the learning unit may separate the foreground and the background from the range image and learn three-dimensional models of the foreground and the background.

In the information input apparatus according to the embodiment of the present disclosure, the learning unit may previously construct a three-dimensional model of a desired apparatus to be controlled before the user actually controls or operates the desired apparatus to be controlled.

In the information input apparatus according to the embodiment of the present disclosure, the learning unit may construct a three-dimensional model of an ambient environment including the desired apparatus to be controlled, then eliminate the desired apparatus to be controlled from the ambient environment, and construct a three-dimensional model of only the desired apparatus to be controlled by detecting a three-dimensional model corresponding to a difference.

In the information input apparatus according to the embodiment of the present disclosure, the state estimation unit may update three-dimensional foreground and background models which have already been constructed by the learning unit, as well as may continue to estimate respective positions and postures of the sensor and the foreground, construct the three-dimensional model of the background while changing a view of the sensor, and then learn the three-dimensional model of the foreground by extracting an area corresponding to the difference with the three-dimensional background model fixed.

In the information input apparatus according to the embodiment of the present disclosure, the learning unit may previously incorporate knowledge about the three-dimensional foreground and background models and subsequently learn the three-dimensional foreground and background models.

In the information input apparatus according to the embodiment of the present disclosure, the learning unit may cut out, as a background, a model whose position or posture does not change in three-dimensional space, cut out, as a foreground model, a target whose position or posture changes frequently, and learn the foreground and background models.

In the information input apparatus according to the embodiment of the present disclosure, the user recognition unit may detect, as the user, a foreground model associated with an area obtained by detecting a human or face from an image captured by the observation unit.

In the information input apparatus according to the embodiment of the present disclosure, the user recognition unit may identify the fingers by previously labeling the fingers, performing graph matching with the labeled fingers and a three-dimensional model of a typical human body which is prepared after the labeling, and noting a foreground of an area corresponding to the labeled node.

In the information input apparatus according to the embodiment of the present disclosure, the user recognition unit may identify a shape of the identified fingers against a typical, three-dimensional hand model which is previously prepared for each hand shape.

In the information input apparatus according to the embodiment of the present disclosure, the user recognition unit may prepare a different, typical, three-dimensional hand model for each user and change the typical, three-dimensional hand model in accordance with a user identified on the basis of the observation data.

In the information input apparatus according to the embodiment of the present disclosure, the apparatus control unit may identify an apparatus to be controlled on the basis of the identified shape, position, and posture of the hand and then issue a control command corresponding to the identified state of the hand or a change in the state, to the apparatus to be controlled.

In the information input apparatus according to the embodiment of the present disclosure, the apparatus control unit may refer to a control command correspondence table, the control command correspondence table defining type-specific correspondences between shapes of hands and control commands, to determine a control command from the user corresponding to the identified state of the hand or a change in the state.

In the information input apparatus according to the embodiment of the present disclosure, the apparatus control unit may use the control command correspondence table where the type-specific correspondences are defined for each apparatus to be controlled.

In the information input apparatus according to the embodiment of the present disclosure, when the user makes a pointing motion where an index finger is raised, the apparatus control unit may recognize a foreground model present on a line extending from a tip of the index finger, as an apparatus to be controlled.

In the information input apparatus according to the embodiment of the present disclosure, the apparatus control unit may determine a control command corresponding to a combination of respective states of left and right hands of the user or a combination of changes in the states.

In the information input apparatus according to the embodiment of the present disclosure, when the apparatus control unit recognizes a display as an apparatus to be controlled, the apparatus control unit may output a control command corresponding to a cursor operation on a screen of the display.

In the information input apparatus according to the embodiment of the present disclosure, the apparatus control unit may specify a three-dimensional motion speed of a cursor position on the screen on the basis of the amount of displacement from a starting position of a finger-pointing motion.

In the information input apparatus according to the embodiment of the present disclosure, the apparatus control unit may obtain an intersection of straight lines extending from the identified fingers of both hands of the user and specify a depth to a three-dimensional user interface on the screen on the basis of the intersection.

In the information input apparatus according to the embodiment of the present disclosure, the apparatus control unit may recognize an apparatus to be controlled and an instruction to be issued to the apparatus to be controlled, on the basis of an intersection of a posture of the recognized pointing fingers of the user and an object in the environment.

In the information input apparatus according to the embodiment of the present disclosure, the apparatus control unit may recognize an apparatus to be controlled on the basis of an intersection of a posture of the recognized fingers of one hand of the user and an object in the environment, as well as may recognize an instruction to be issued to the apparatus to be controlled on the basis of a shape of the recognized fingers of the other hand of the user or a change in a position and posture of the fingers of the other hand and output a control command.

According to another embodiment of the present disclosure, there is provided a method for inputting information. The method for inputting information includes observing an environment including a user and one or more apparatuses to be controlled; separating a foreground and a background from observation data obtained in the observing step, the foreground including the user and the one or more apparatuses to be controlled, the background including the environment except for the foreground, and learning three-dimensional models of the foreground and the background; estimating positions and postures of already modeled foregrounds in the environment; identifying fingers of the user from the foreground and recognizing a shape, position, and posture of the fingers; and outputting a control command to the one or more apparatuses to be controlled on the basis of the shape, position, and posture of the fingers recognized in the recognizing step.

According to yet another embodiment of the present disclosure, there is provided a computer program written in computer-readable form to cause a computer to function as an observation unit configured to observe an environment including a user and one or more apparatuses to be controlled, the observation unit including a sensor; a learning unit configured to separate a foreground and a background from observation data obtained by the observation unit, the foreground including the user and the one or more apparatuses to be controlled, the background including the environment except for the foreground, and to learn three-dimensional models of the foreground and the background; a state estimation unit configured to estimate positions and postures of already modeled foregrounds in the environment; a user recognition unit configured to identify fingers of the user from the foreground and to recognize a shape, position, and posture of the fingers; and an apparatus control unit configured to output a control command to the one or more apparatuses on the basis of the shape, position, and posture of the fingers recognized by the user recognition unit.

The computer program according to yet another embodiment of the present disclosure is formed by defining a computer program written in computer-readable form to execute a predetermined process on a computer. In other words, by installing the computer program according to yet another embodiment of the present disclosure on a computer, collaborative functions are performed on the computer, and effects similar to those of the information input apparatus according to the embodiment of the present disclosure can be obtained.

According to the embodiments of the present disclosure, it is possible to provide an excellent information input apparatus, information input method, and computer program which can input a control command to an apparatus to be controlled on the basis of an intuitive motion made by the user, such as a gesture of a hand.

According to the embodiments of the present disclosure, the user does not have to hold any special pointing device in the input of a control command using a gesture of a hand and can operate the apparatus to be controlled with his or her hands empty.

Further, the information input apparatus according to the embodiment of the present disclosure recognizes the position and posture of the fingers of the user using the global coordinate system. This results in an increase in the flexibility of the placement position of the device that observes the hand of the user.

The information input apparatus according to the embodiment of the present disclosure continuously tracks the position and posture of the fingers of the user using a three-dimensional model of the fingers, without depending on the outline of the fingers. Accordingly, from whatever direction the fingers are observed, the information input apparatus can recognize the fingers without problems. Further, when keeping track using a three-dimensional model of the fingers, the information input apparatus does not lose track of the feature points of the three-dimensional model. Accordingly, it can stably recognize the position and posture of the fingers of the user.

According to the information input apparatus according to the embodiment of the present disclosure, the user can specify the depth by measuring the position of the user relative to the apparatus to be controlled or combining and recognizing the postures of the fingers of both hands of the user, and then obtaining the intersection of straight lines extending from the fingers of both hands. Thus, the flexibility of the GUI design displayed on the display is increased, allowing the menu on a 3D-display or the like to be selected more conveniently.

Other objects, features, and advantages of the present disclosure will become apparent from the following detailed description of an embodiment thereof in conjunction with the accompanying drawings.

BRIEF DESCRIPTION OF THE DRAWINGS

FIG. 5 is a diagram showing an example of a control command correspondence table which defines type-specific correspondences between shapes of hands and control commands;

FIG. 11 is a drawing where the user is instructing the information input apparatus to turn or off a light fixture in a home living environment or the like; and FIG. 12 is a diagram where the user is showing the information input apparatus that a television, music playback system, or the like is an apparatus to be controlled and instructing the information input apparatus to perform a change in the luminance or volume of the display, or the like.

DETAILED DESCRIPTION OF EMBODIMENTS

Now, an embodiment of the present disclosure will be described in detail with reference to the accompanying drawings.

Figure 1:
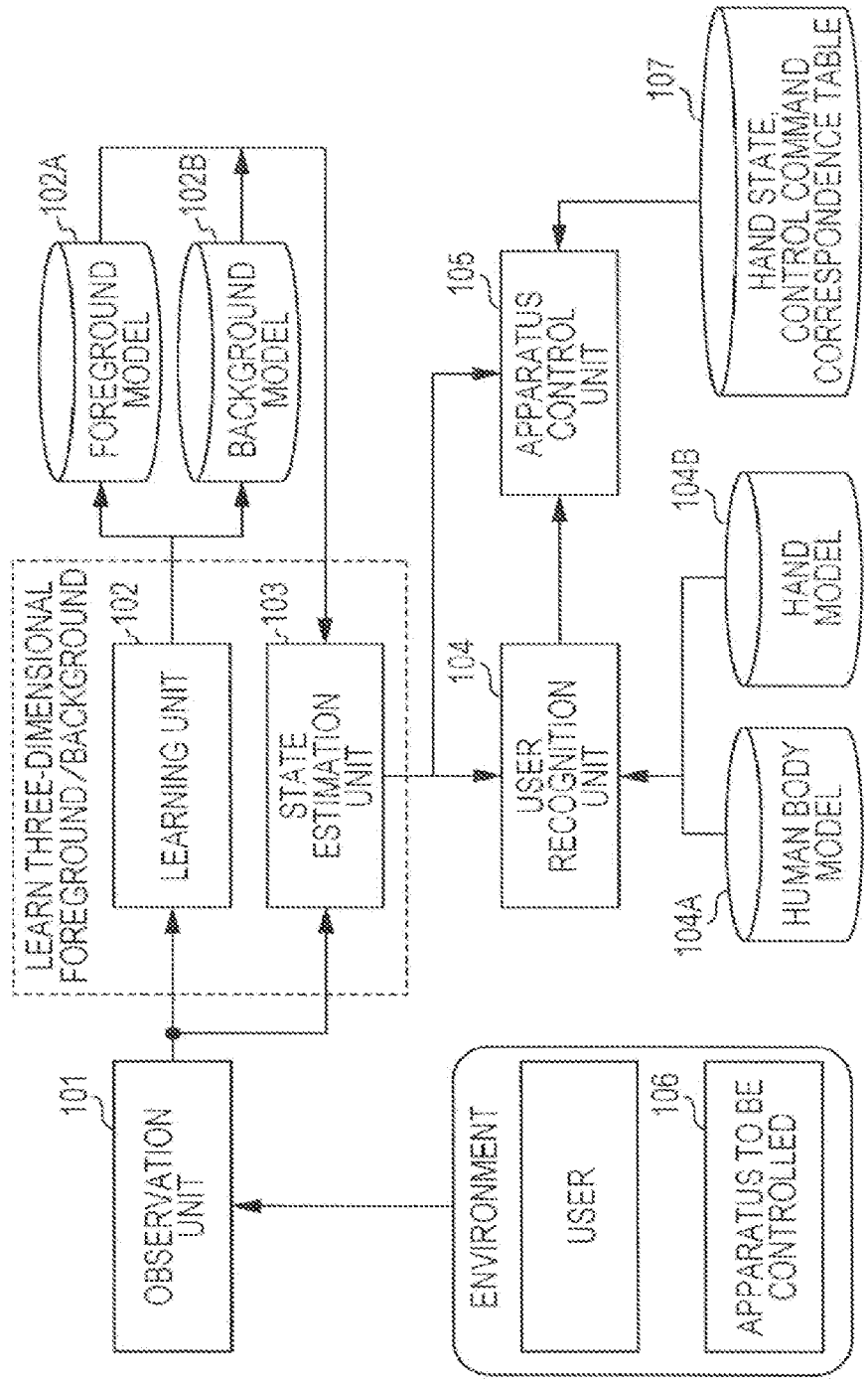
FIG. 1 is a diagram schematically showing a functional configuration of an information input apparatus according an embodiment of the present disclosure.

FIG. 1 schematically shows a functional configuration of an information input apparatus 100 according an embodiment of the present disclosure. The information input apparatus 100 shown in FIG. 1 includes an observation unit 101, a learning unit 102, a state estimation unit 103, a user recognition unit 104, and an apparatus control unit 105. In an environment where there is a user and one or more apparatuses 106 to be controlled by the user, the information input apparatus 100 can remotely operate an apparatus 106 which the user desires to control.

The observation unit 101 observes the environment including the user and the one or more apparatuses to be controlled and outputs observation data to the learning unit 102.

The learning unit 102 separates, from the observation data from the observation unit 101, a foreground including the user and the desired apparatus to be controlled and a background including the environment except for the foreground and learns three-dimensional models of the foreground and the background.

The state estimation unit 103 estimates the positions in which already modeled individual foregrounds are disposed in the environment, and the postures of the foregrounds.

The user recognition unit 104 identifies the user and in particular the fingers thereof from the foreground and recognizes the shape, position, and posture of the fingers.

The apparatus control unit 105 outputs a control command to the apparatus 106 to be controlled on the basis of the shape of the fingers of the user and time series information on a change in the state of the fingers.

The above-mentioned units 101 to 106 will be described in detail below.

The observation unit 101 is a unit that meets requirements to observe sufficient information for the learning unit 102 subsequent to the observation unit 101 to separate a foreground and a background from obtained image sequence and learn three-dimensional models of the foreground and background.

The observation unit 101 is, for example, a unit including a sensor that can obtain a range image. Examples of the sensor for acquiring a range image include sensors that perform stereo matching using a binocular camera, time of flight (TOF) sensors that measure a range image on the basis of the time of a round trip of an infrared ray to the target object, such as DepthSense available from Optrima (for example, see http://www.softkinetic.com/Solutions/Depth-Sensecameras.aspx (as of Mar. 19, 2012)), and sensors that calculate a range image using triangulation by applying an infrared pattern to the target object, such as cameras which are used in Kinect and available from PrimeSense. Of course, the observation unit 101 is not limited to units for acquiring a range image and may be cameras for acquiring a normal RGB image, as long as the above-mentioned requirements are met.

It is assumed that if the view of the sensor included in the observation unit 101 is limited, the position or direction of the sensor is changed by driving the base having the sensor mounted thereon so that the sensor can observe the entire environment including the user and the apparatuses 106 to be controlled.

The learning unit 102 separates a foreground and background from the observation data obtained from the observation unit 101 and learns three-dimensional models thereof. The learning results are stored in storage media, such as a foreground model storage unit 102A and a background model storage unit 102B.

The learning unit 102 may sequentially learn a foreground model from observation data. On the other hand, for an existing model, such as a home electrical appliance which is previously disposed in a home environment, a previously generated three-dimensional model may be set from outside.

When the user specifies an apparatus 106 to be controlled disposed in the environment (in the room of the user, etc.), the state estimation unit 103 has to obtain a three-dimensional model of the apparatus 106 to be controlled so as to estimate the position or posture of the apparatus 106 to be controlled. A specific method for previously registering a model is as follows. A three-dimensional model of an ambient environment including an apparatus 106 to be controlled that the user desires to register is constructed; then the desired apparatus 106 to be controlled is eliminated from the ambient environment; and a three-dimensional model corresponding to the difference is detected. Thus, a three-dimensional model only including the apparatus 106 to be controlled is constructed. In this way, the user previously registers three-dimensional models of apparatuses to be controlled, such as a television and light fixture, which are usually disposed in the room, before actually controlling these apparatuses. Further, an identification tag is assigned to an apparatus corresponding to each registered three-dimensional model, and a control command correspondence table 107 discussed below is associated with each tagged apparatus.

The background model is a three-dimensional model of the entire environment except for a portion which is determined to be a foreground. The learning unit 102 sequentially updates the background model by adding observation data obtained from the observation unit 101 thereto. Accordingly, even with respect to a range which the observation unit 101 has not actually observed, models are present in virtual space.

The state estimation unit 103 estimates the position or orientation of the sensor from the foreground and background stored in the foreground model storage unit 102A and the background model storage unit 102B, respectively, as well as the observation data outputted by the observation unit 101. Simultaneously, the state estimation unit 103 estimates the position and posture of the foreground model (the user and the apparatus 106 to be controlled) in the background model.

Figure 2:
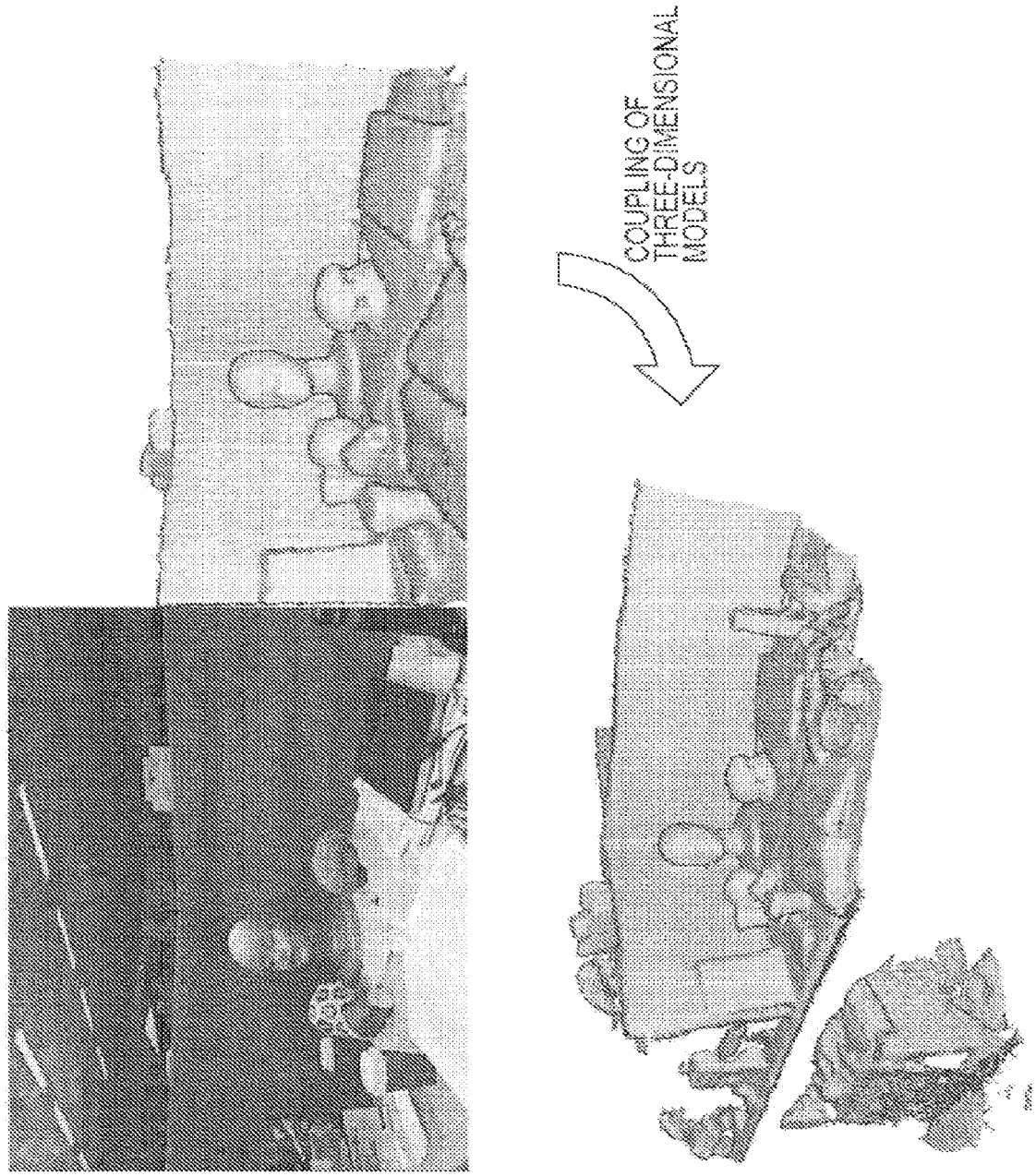
FIG. 2 is a drawing showing an example of a result obtained by learning three-dimensional models from observation data.
Figure 3:
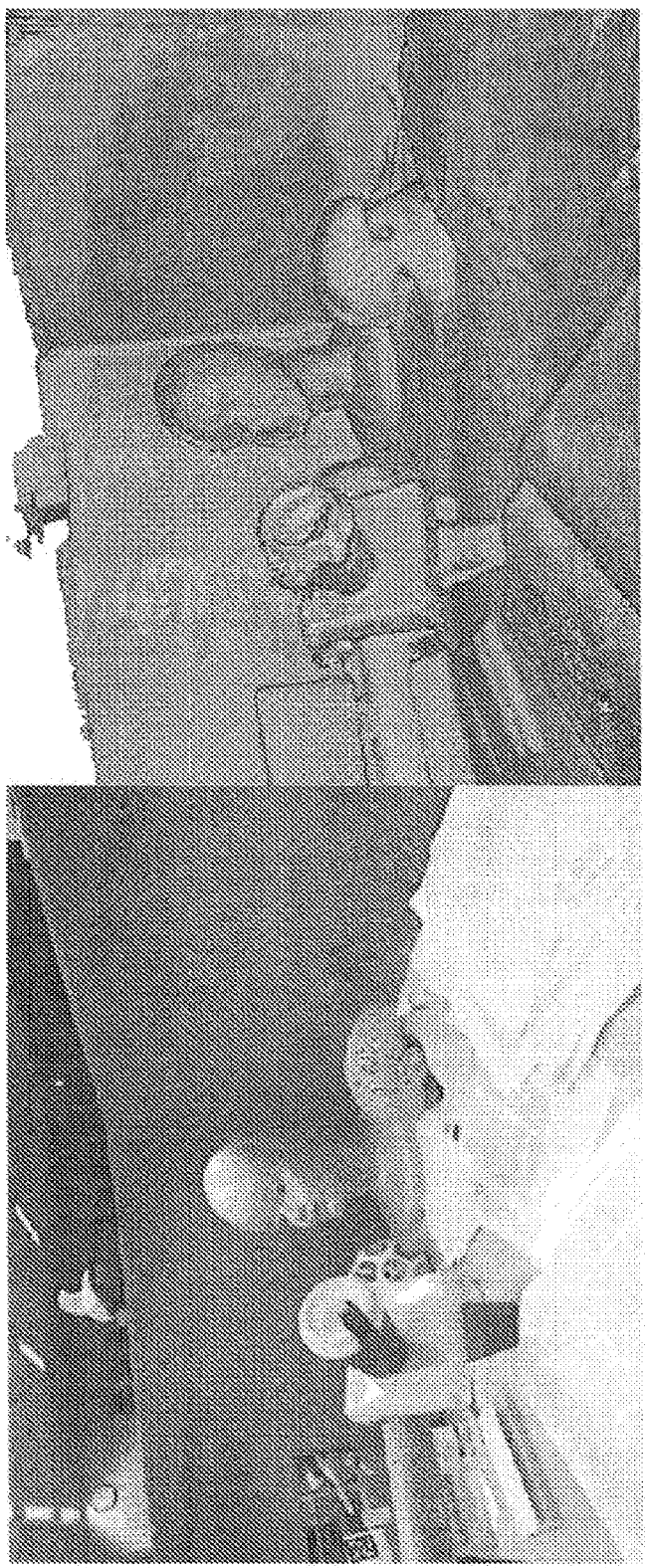
FIG. 3 is a drawing showing an example of a result obtained by learning a foreground model.

In this embodiment, the learning unit 102 and the state estimation unit 103 work together, learn from observation data obtained sequentially, and update the foreground and the background, as well as continue to estimate the respective states of the sensor and the foreground (a total of six degrees of freedom of position and posture). Specifically, first, the units 102 and 103 change the point of view of the sensor using KinnectFusion (for example, see Shahram Izadi, et al., "KinectFusion: Real-time 3D Reconstruction and Interaction Using a Moving Depth Camera", *ACM Symposium on User Interface Software and Technology*, 2011) or DTAM (for example, see Richard A. Newcombe, et al., "DTAM: Dense Tracking and Mapping in Real-Time", *ICCV*, 2011)), then construct a three-dimensional background model from the captured range image or RGB image (for example, see FIG. 2), then fix the background model, extract an area corresponding to the difference, and thus can learn a foreground model (for example, see FIG. 3). Alternatively, by previously incorporating knowledge about foreground and background models and then learning from the knowledge, the units 102 and 103 may separate and learn a foreground and a background (for example, cut out, from three-dimensional space, a model whose position or posture does not change, as a background, and a target whose position or posture frequently changes, as a foreground model and learn the foreground and background models).

Figure 4:
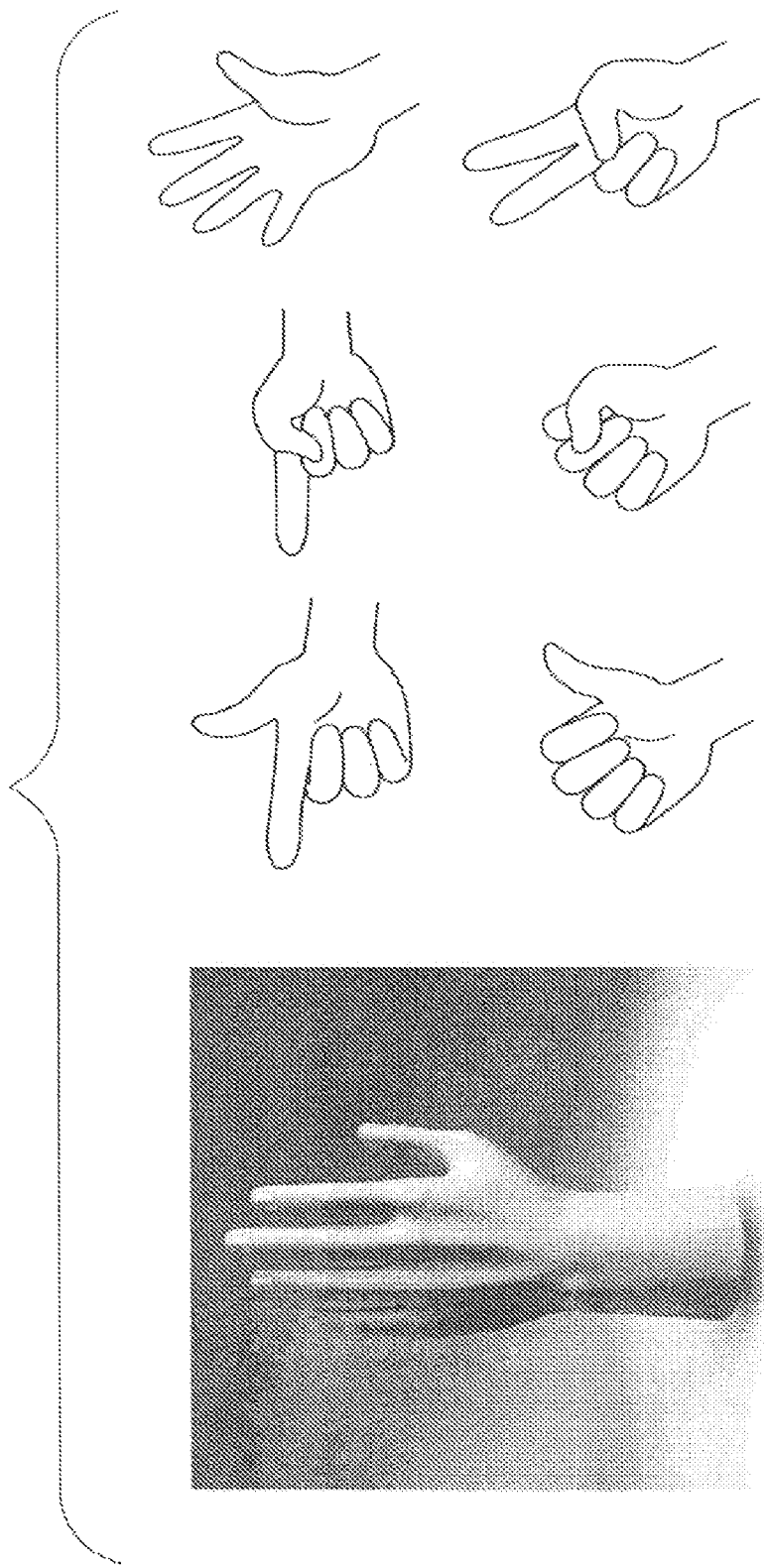
FIG. 4 is a drawing showing an example of a previously prepared, typical, three-dimensional hand model.

The user recognition unit 104 identifies, from the recognized foreground, a model of the user who is operating the apparatus, and determines the shape or posture of the fingers of the user in the foreground model. For the detection of the user, a foreground model associated with a human area detected from a captured image (for example, see MITSUI Tomokazu, YAMAUCHI Yuji and FUJIYOSHI Hironobu: "Human Detection by Two stages AdaBoost with Joint HOG", *fourteenth Image Sensing Symposium SSII08*, 2008) or a human area obtained from face detection (for example, see Japanese Unexamined Patent Application Publication No. 2005-157679) may be detected as the user. Other detection methods include a method of detecting the fingers by previously labeling the fingers, by performing graph matching (for example, see Sundar, H., et al., "Skeleton Based Shape Matching and Retrieval", *Proceedings of the Shape Modeling International*, 2003) between the labeled fingers and a three-dimensional model of a typical human body, that is, a human body model 104A, and by paying attention to the foreground of the fingers corresponding to the labeled node. The shape of the identified fingers is identified against a hand model 104B. The hand model 104B is a typical three-dimensional hand model which is previously prepared for each of hand shapes, such as a scissors shape, where the index finger is raised, a rock shape, and a paper shape, so as to associate each hand shape with different apparatus control commands (for example, see Robert Osada et al., "Shape distributions", *ACM Transactions on Graphics (TOG)*, 2002). An example of the previously prepared typical three-dimensional hand model is shown in FIG. 4.

The hand shape seems to subtly vary among users. Accordingly, different models may be registered for each user so as to increase the accuracy of state estimation. In this case, it is preferred to identify the user by performing face recognition or the like on observation data and to change the model for each identified user.

The apparatus control unit 105 first identifies an apparatus to be controlled on the basis of the identified shape of the hand and the position or posture of the hand, then determines a control command corresponding to the identified state of the hand or a change in the state, and issues the control command to the apparatus to be controlled.

In this embodiment, the user can input a control command using the shape of the hand, and the state of the hand or a change in the state, in other words, using a gesture of the hand. To allow input based on a gesture of the hand, the apparatus control unit 105 may use the control command correspondence table 107, where the type-specific correspondences between shapes of the hand and control commands are defined. A control command correspondence table 107 may be defined for each apparatus to be controlled so that different control commands can be associated with the same hand shape among the apparatuses.

FIG. 5 shows an example of the control command correspondence table 107. In the control command correspondence table 107, control commands corresponding to the shapes of the left and right hands are defined for each of multiple types of apparatuses to be controlled, such as a television, a music playback system, a light fixture, and a pot.

For example, assume that the user makes a motion pointing to a display screen with his or her index finger raised. In this case, a foreground model on a line extending from the fingertip can be identified in virtual space which is synthesized from the result of the recognition by the state estimation unit 103 and the user recognition unit 104, and the apparatus to be controlled can be recognized as a television. Further, from the control command correspondence table 107, the apparatus control unit 105 can recognize that a control command corresponding to the finger-pointing motion by the user is intended to move the cursor and thus can move the cursor on the display located on the line extending from the fingertip.

The upper half of the control command correspondence table 107 illustrated in FIG. 5 shows motions of one hand; the lower half thereof shows motions of the other hand. For example, the upper half is allocated to the left hand, and the lower half to the right hand. It is easy to reverse this allocation. There may be apparatuses which are controlled not only by one hand but also by a combination of the left and right hands. In the table shown in FIG. 5, the commands corresponding to the shaded shapes of a hand 1 (left hand) can be combined with those corresponding to the shaded shapes of a hand 2 (right hand).

For example, if the user desires to change the channel of the television, the user first points to the television by forming the hand 1 into shape 2. As a result, the apparatus control unit 105 recognizes that the television is an apparatus to be controlled. In the above state, the user has only to form the hand 2 into shape 1 to make a channel change gesture using the hand 2. For the gesture of the hand 2, gestures, such as circle drawing and reciprocation, may be made, as discussed below. On the other hand, if the user desires to power off the television, he or she can do this by using only the hand 1, as discussed below. Specifically, the user has only to first form the hand 1 into shape 2 to point to the television and then to change it to shape 5. In contrast, if the user desires to power on the television, he or she has only to form the hand 1 into shape 2 to point to the television.

The spatial meaning of a pointing motion of pointing a fingertip at an apparatus 106 to be controlled is defined by the position of the fingertip relative to the apparatus 106 to be controlled. Accordingly, the special meaning does not depend on the position or posture of the sensor of the observation unit 101, which generates observation data. For this reason, in the determination of the position in which the observation unit 101 is to be disposed in work space, the position in which the user stands or the position in which the apparatus to be controlled is disposed does not have to be considered. On the other hand, the user can make a pointing motion without having to become conscious of the position of the sensor and thus can concentrate on intuitively operating the apparatus 106 to be controlled.

Figure 6:
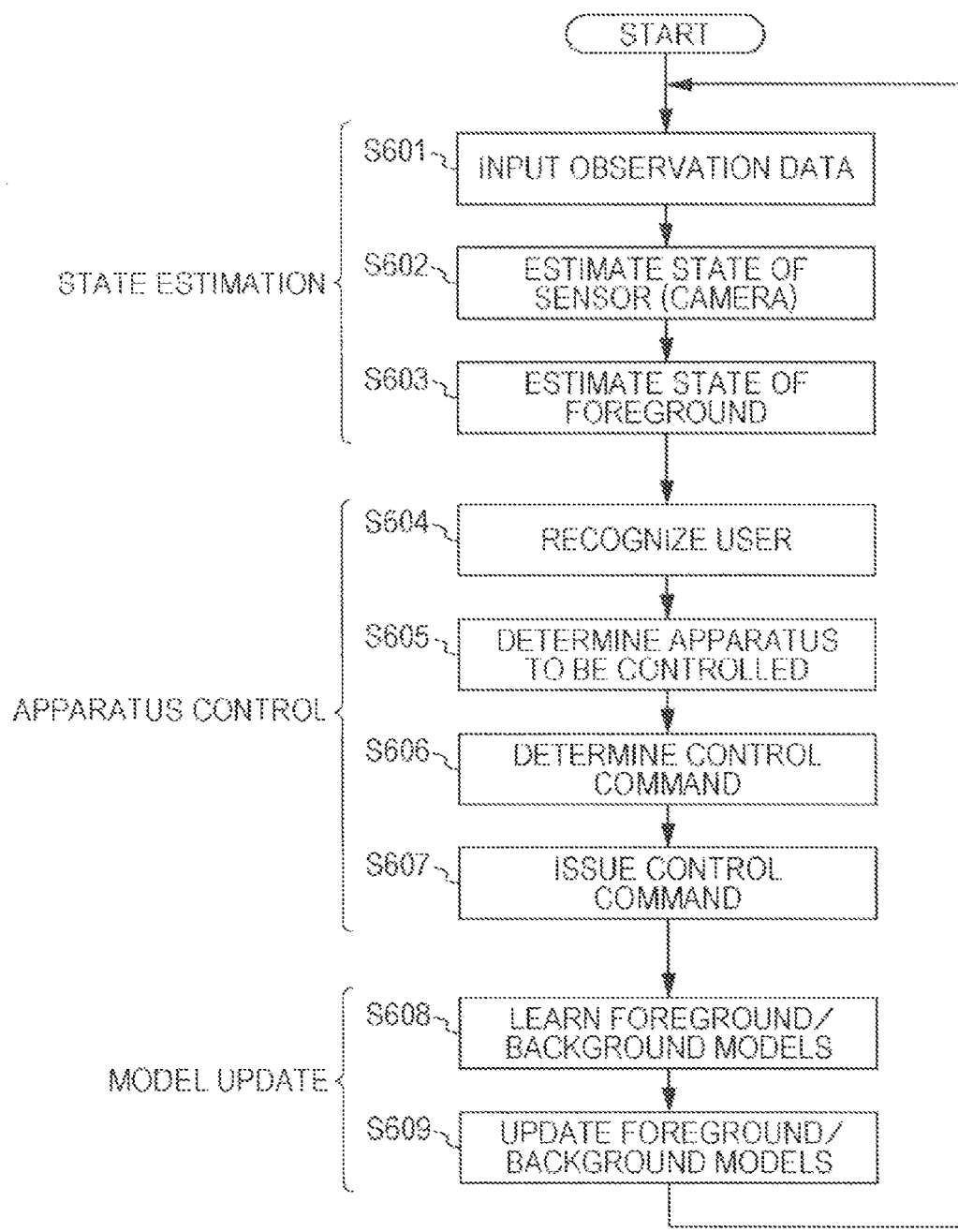
FIG. 6 is a flowchart showing a process in which the information input apparatus controls an apparatus on the basis of a gesture of a hand of a user.

FIG. 6 is a flowchart showing process steps in which the information input apparatus 100 according to this embodiment controls an apparatus on the basis of a gesture of a hand of the user.

First, the observation unit 101 observes the environment and outputs obtained observation data to the state estimation unit 103 (step S601).

The state estimation unit 103 estimates the position and posture of the sensor of the observation unit 101 (step S602), as well as estimates the position and posture of the foreground model (step S603).

Subsequently, the user recognition unit 104 identifies the fingers of the user from the foreground and recognizes the shape, position, and posture of the fingers (step S604).

The apparatus control unit 105 first identifies the apparatus to be controlled on the basis of the recognized shape, position, and posture of the hand and then determines a control command corresponding to the identified state of the hand or a change in the state (step S606). The apparatus control unit 105 then issues the determined control command to the apparatus to be controlled (step S607).

The learning unit 102 learns foreground and background models and additionally stores these models in the foreground model storage unit 102A and the background model storage unit 102B, respectively (step S608). The learning unit 102 also sequentially updates the already stored foreground and background models (step S609). The process then returns to step S601, and the above-mentioned process steps are repeated.

Finally, an example UI operation using the information input apparatus 100 according to this embodiment will be described with reference to the drawings.

(1) GUI Operation on 2D/3D Screen

Figure 7:
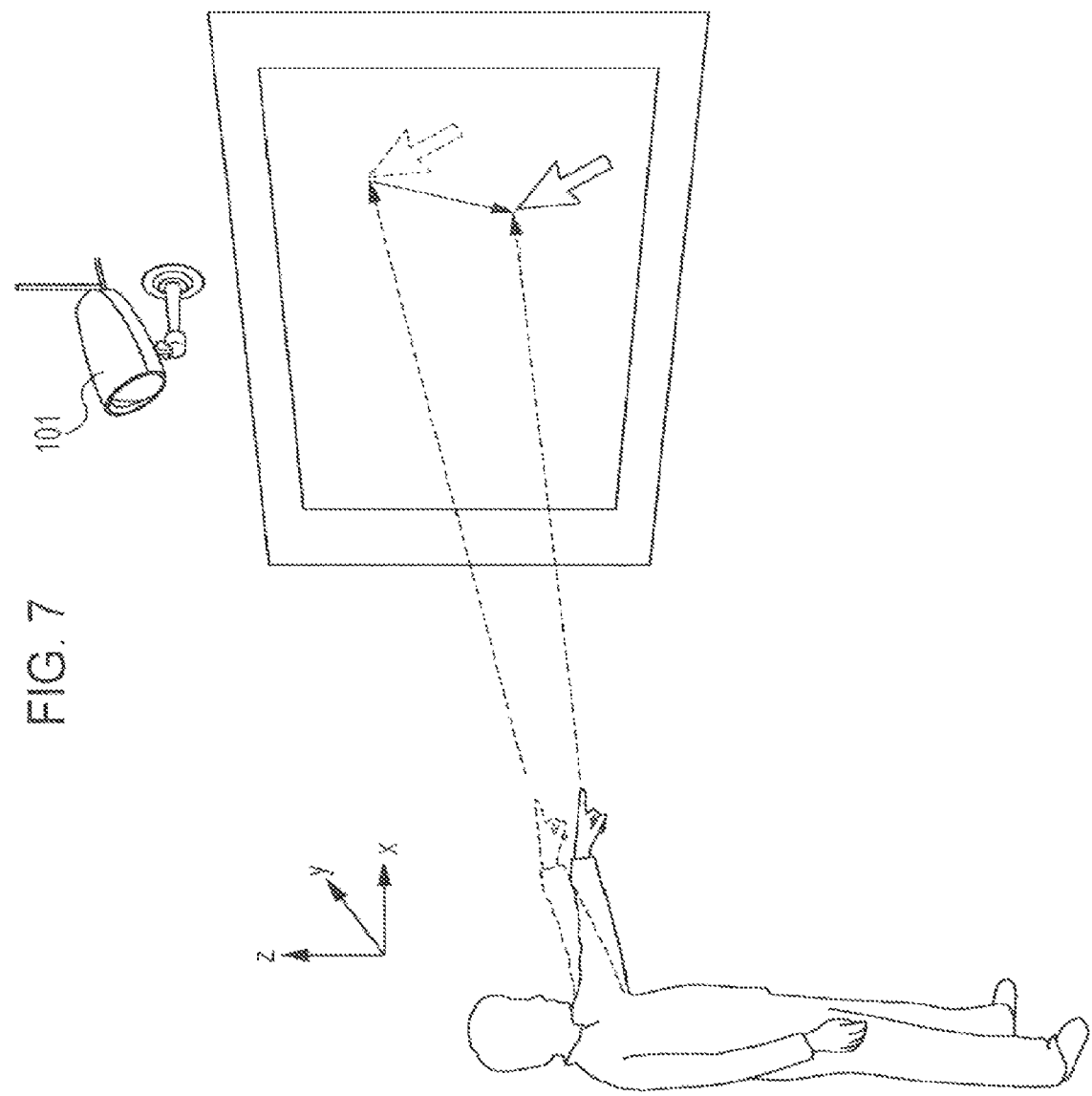
FIG. 7 is a diagram where the user is operating a cursor on the screen of a display via the information input apparatus.

FIG. 7 shows a diagram where the user is operating a cursor on the screen of the display via the information input apparatus 100 according to this embodiment (not shown in FIG. 7). The information input apparatus 100 recognizes a finger pointing to a display of the user on the basis of observation data (range image, etc.) obtained by the observation unit 101, for example, disposed above the display and, from the position and posture of the fingers, recognizes that the display is an apparatus to be controlled. Subsequently, based on changes in the position and posture of the fingers, the information input apparatus 100 outputs a control command corresponding to a cursor operation on the display screen.

Figure 8:
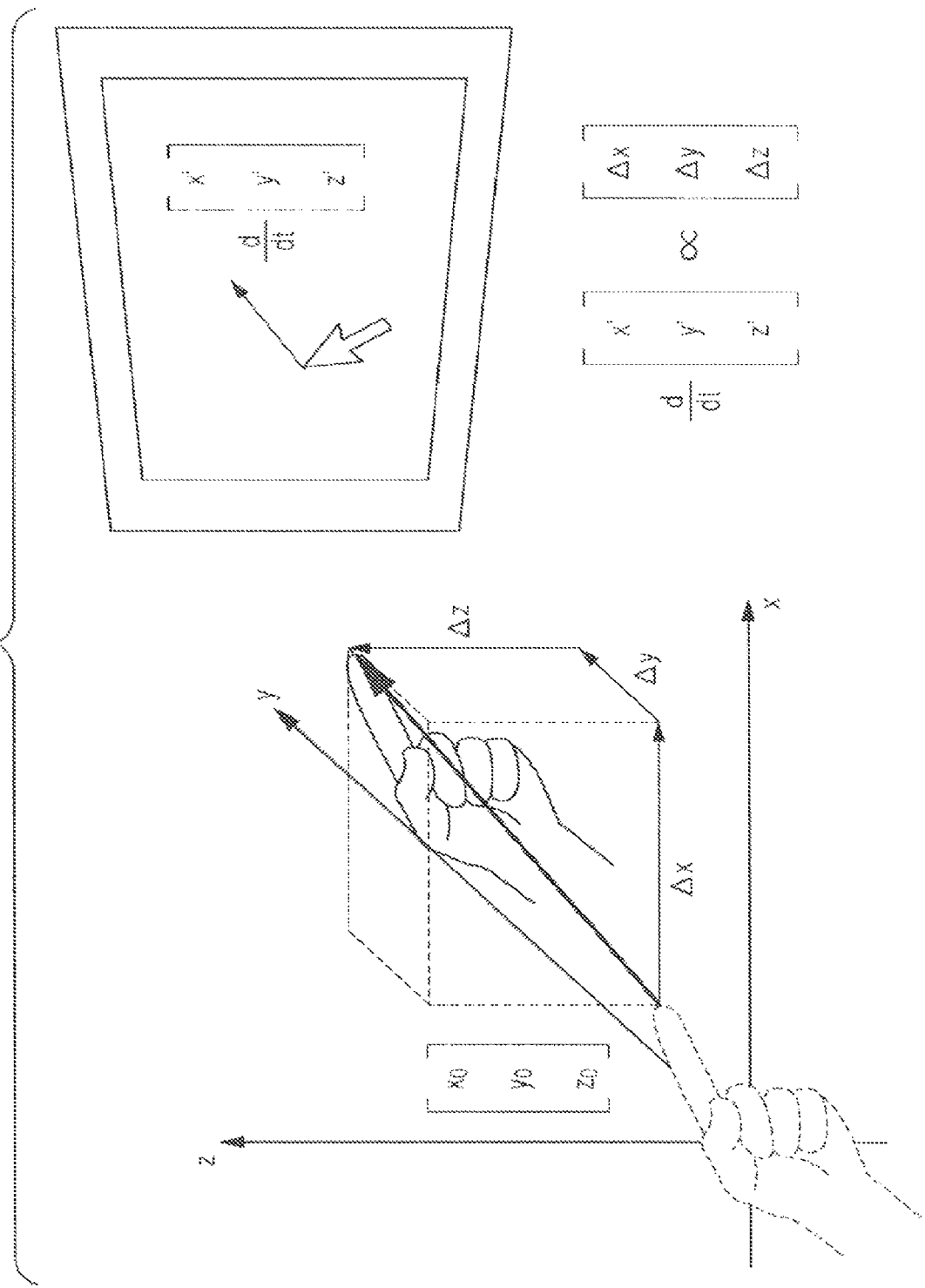
FIG. 8 is a diagram where the user is specifying a three-dimensional motion speed of a cursor position on the screen on the basis of the amount of displacement from the starting position of a finger-pointing motion.

FIG. 8 shows a diagram where the user is specifying the three-dimensional motion speed of a cursor position (x',y',z') on the screen on the basis of the amount of displacement ($\Delta$x,$\Delta$y,$\Delta$z) from the start position of the finger-pointing motion. In the example shown in FIG. 8, the user is giving, to the cursor, a three-dimensional motion speed proportional to the amount of displacement from the start position of the finger-pointing motion.

Figure 9:
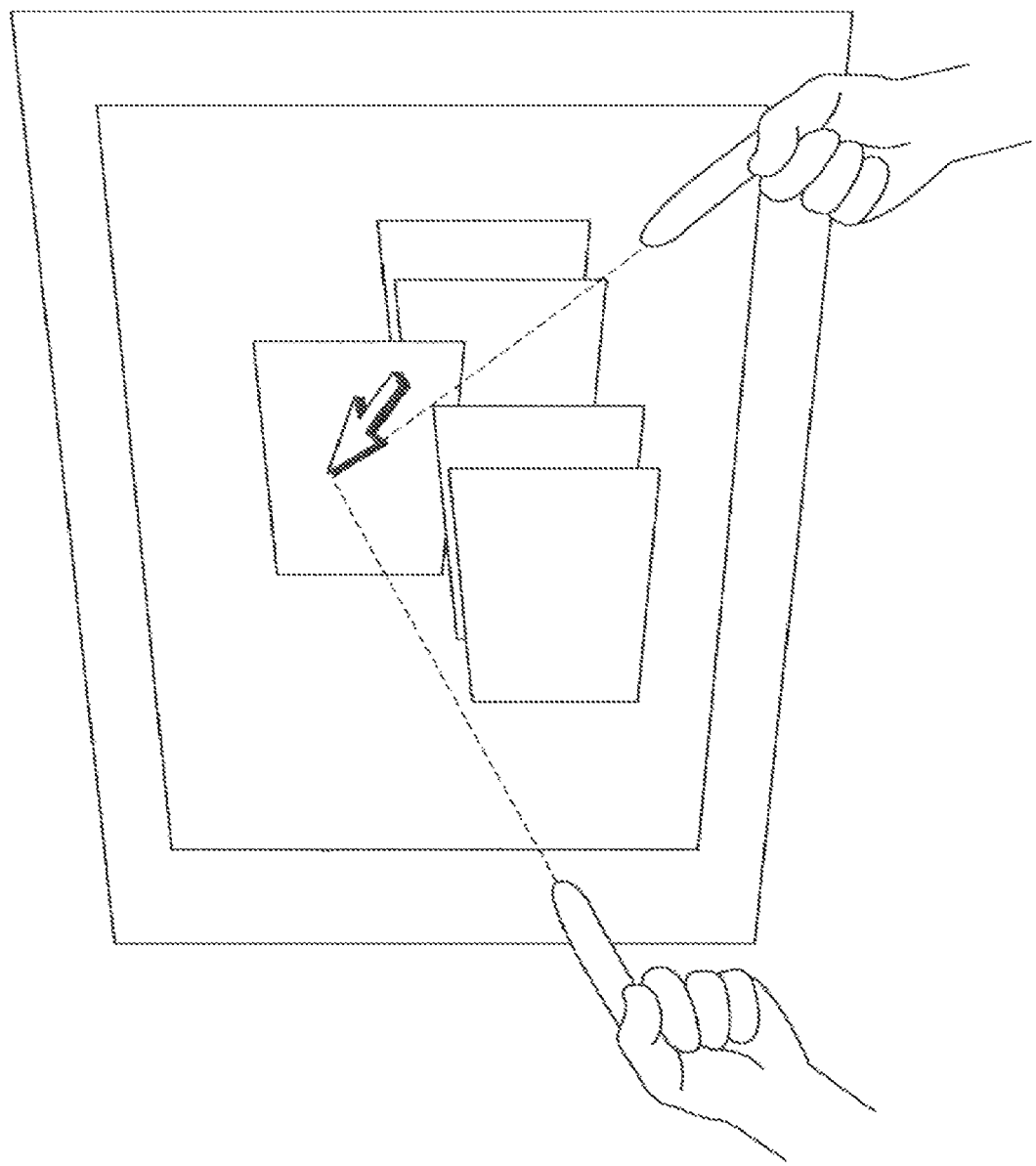
FIG. 9 is a diagram where the user is making, on a three-dimensional GUI, a pointing motion of obtaining the intersection of straight lines extending from fingertips of both hands to specify the depth.

FIG. 9 shows a diagram where the user is making, on the three-dimensional GUI of a personal computer or the like, a pointing motion of obtaining the intersection of straight lines extending from fingertips of both hands to specify the depth. Thus, the flexibility of a GUI design displayed on the display is increased, allowing a menu on a 3D-display or the like to be selected more conveniently.

(2) Instructing Robot to Carry Particular Object

Figure 10:
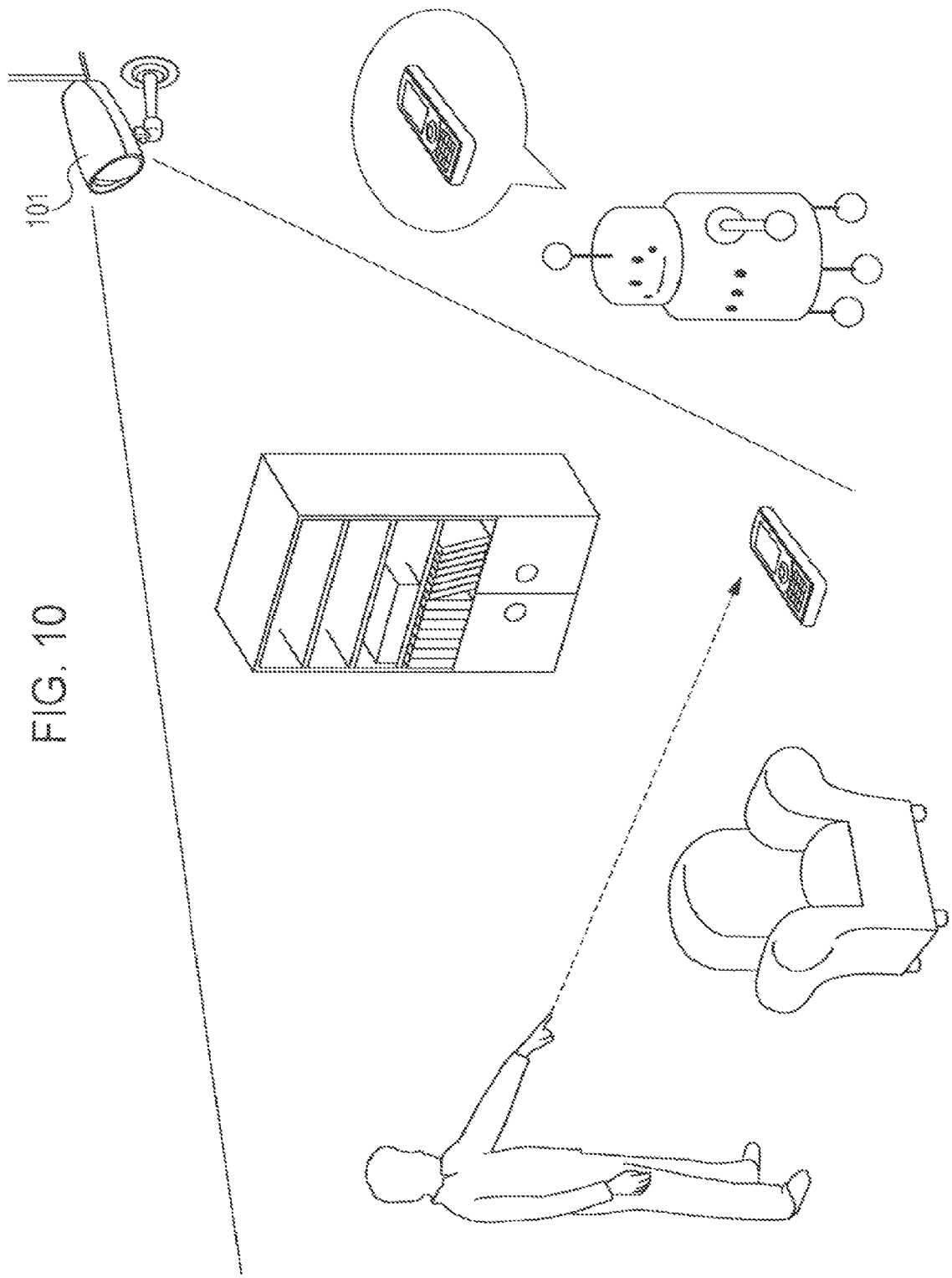
FIG. 10 is a drawing where the user is instructing a robot to carry an object.

FIG. 10 shows a diagram where the user is instructing a robot to carry an object to be carried, via the information input apparatus 100 according to this embodiment (not shown in FIG. 10). For example, the information input apparatus 100 recognizes the fingers of the user on the basis of observation data (range image, etc.) obtained by the observation unit 101 disposed in the environment. Then, from the intersection of the posture of the fingers taking a pointing shape and an object in the environment, the information input apparatus 100 recognizes that the apparatus to be controlled is a robot. Further, from the intersection of the posture of the fingers taking a pointing shape and another object in the environment, the information input apparatus 100 recognizes that the user is instructing the robot to carry the other object and outputs a control command to carry the other object, to the robot.

(3) Powering On/Off Home Electrical Appliances

Figure 11:
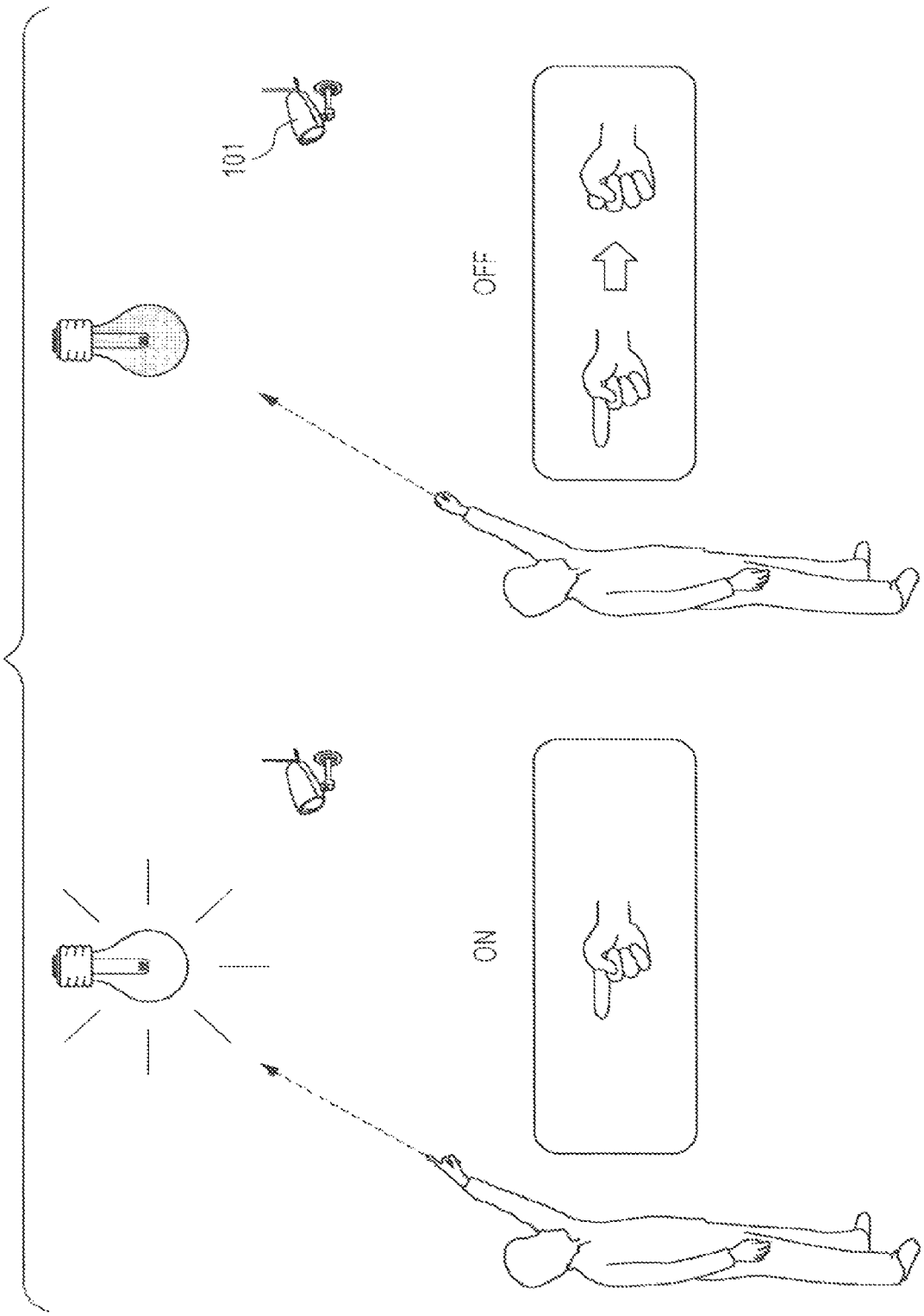

FIG. 11 shows diagrams where the user is instructing the information input apparatus 100 according to this embodiment (not shown in FIG. 11) to turn on or off a light fixture in a home living environment or the like. For example, the information input apparatus 100 recognizes the fingers of the user on the basis of observation data (range image, etc.) obtained by the observation unit 101 disposed in a home living environment. Then, from the intersection of the posture of the fingers taking a pointing shape and an object in the home living environment, the information input apparatus 100 recognizes that the light fixture is an apparatus to be controlled. Further, from a change in the shape of the fingers of the user, the information input apparatus 100 recognizes that the user is instructing the information input apparatus 100 to turn on or off the light fixture and outputs, to the light fixture, a control command to turn it on or off.

(4) Adjusting Volume or the Like Using Gesture

Figure 12:
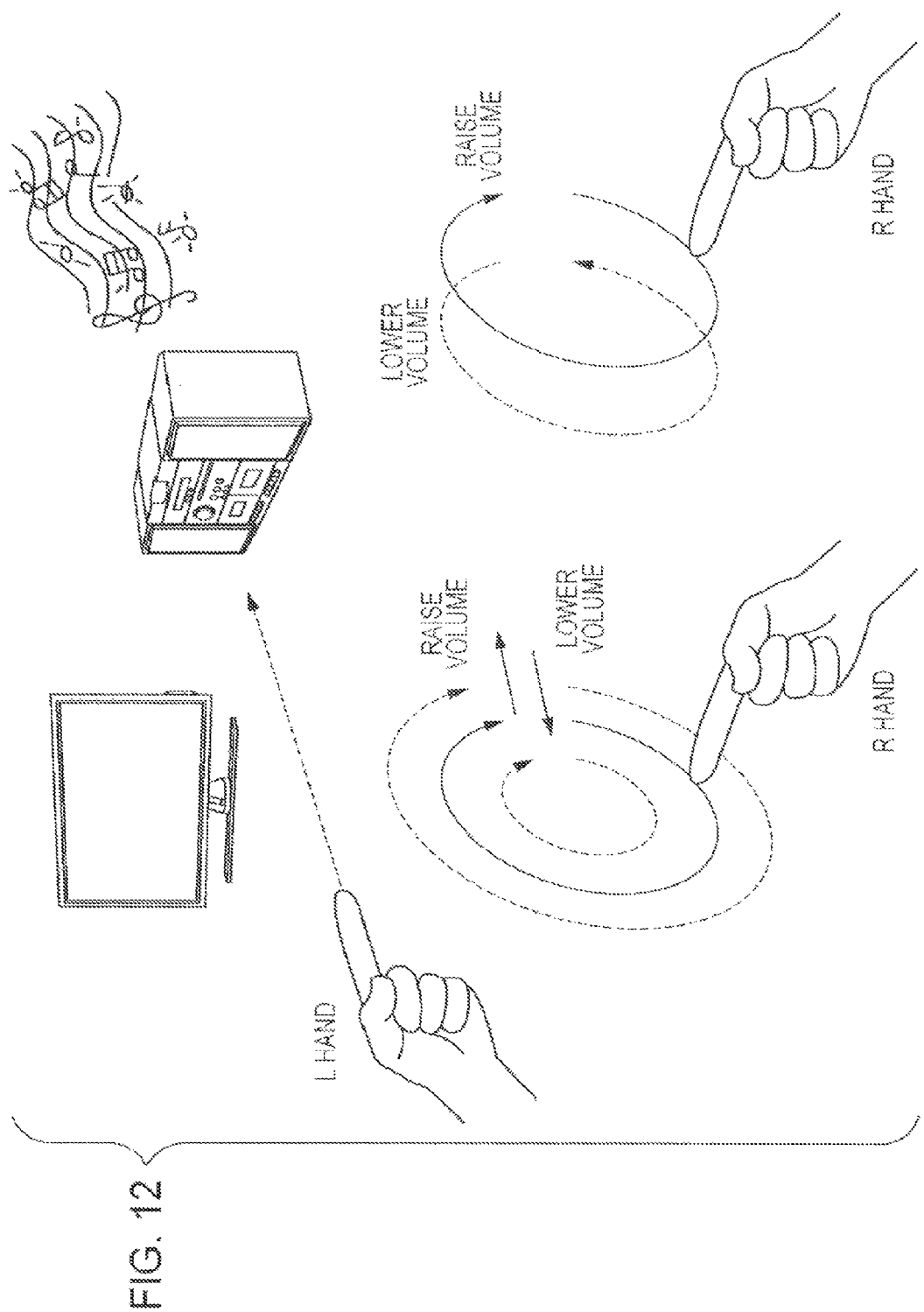

FIG. 12 shows a diagram where the user is showing the information input apparatus 100 according to this embodiment (not shown in FIG. 12) that a television, music playback system, or the like is an apparatus to be controlled and instructing the information input apparatus 100 to perform a change in the luminance or volume of the display, or the like. In the example shown in FIG. 12, the user is specifying an apparatus to be controlled using a finger of one hand (left hand) and is inputting a control command to the apparatus to be controlled using a gesture of a finger of the other hand (right hand). For example, the information input apparatus 100 recognizes the fingers of both hands of the user on the basis of observation data (range image, etc.) obtained by the observation unit 101 (not shown in FIG. 12) disposed in the environment. From the intersection of the posture of the fingers of the left hand taking a pointing shape and an object in the home living environment, the information input apparatus 100 recognizes that the user is designating a television or music playback system as an apparatus to be controlled. Further, the information input apparatus 100 recognizes that the user is instructing the information input apparatus 100 to perform a change in the luminance or volume of the display of the apparatus to be controlled, or the like on the basis of the pointing shape of the right-hand finger or changes in position and posture of the right-hand finger (that is, a gesture of the right-hand finger) and outputs a control command to the television or music playback system.

In any of the example operations shown in FIGS. 7 to 12, the user does not have to hold any special pointing device in the input of a control command using a gesture of a hand and can operate the apparatus to be controlled with his or her hands empty.

Further, the information input apparatus 100 recognizes the position and posture of the fingers of the user using the global coordinate system. This results in an increase in the flexibility of the placement position of the device that observes the hands of the user. For example, even when the observation unit is disposed in a desired position, such as a position from which space can be seen more widely, without considering the relative positional relationship between the observation unit, and the user or the apparatus to be controlled, an intuitive input operation by the user would not be hampered. Further, in inputting a control command, the user does not have to become conscious of the position of the observation unit and only has to become conscious of the position of the user relative to the apparatus to be controlled. Thus, the user can input a control command using an intuitive motion.

Further, the information input apparatus 100 continuously tracks the position and posture of the fingers of the user using a three-dimensional model of the fingers without depending on the outline of the fingers. Accordingly, from whatever direction it observes the fingers, the information input apparatus 100 can recognize the fingers without problems. Further, in tracking the position and posture of the fingers using a three-dimensional model of the fingers, the information input apparatus 100 does not lose track of the feature points of the fingers. Accordingly, it can stably recognize the position and posture of the fingers of the user.

The present disclosure may be configured as follows.

(1) An information input apparatus including an observation unit configured to observe an environment including a user and one or more apparatuses to be controlled, the observation unit including a sensor; a learning unit configured to separate a foreground and a background from observation data obtained by the observation unit, the foreground including the user and the one or more apparatuses to be controlled, the background including the environment except for the foreground, and to learn three-dimensional models of the foreground and the background; a state estimation unit configured to estimate positions and postures of already modeled foregrounds in the environment; a user recognition unit configured to identify fingers of the user from the foreground and to recognize a shape, position, and posture of the fingers; and an apparatus control unit configured to output a control command to the one or more apparatuses to be controlled on the basis of the shape, position, and posture of the fingers recognized by the user recognition unit.

(2) The information input apparatus according to the above-mentioned (1), wherein the observation unit obtains a range image of the environment, and wherein the learning unit separates the foreground and the background from the range image and learns three-dimensional models of the foreground and the background.

(3) The information input apparatus according to the above-mentioned (1), wherein the learning unit previously constructs a three-dimensional model of a desired apparatus to be controlled before the user actually controls or operates the desired apparatus to be controlled.

(4) The information input apparatus according to the above-mentioned (3), wherein the learning unit constructs a three-dimensional model of an ambient environment including the desired apparatus to be controlled, then eliminates the desired apparatus to be controlled from the ambient environment, and constructs a three-dimensional model of only the desired apparatus to be controlled by detecting a three-dimensional model corresponding to a difference.

(5) The information input apparatus according to the above-mentioned (1), wherein the state estimation unit updates foreground and background models which have already been constructed by the learning unit, as well as continues to estimate respective positions and postures of the sensor and the foreground, constructs the three-dimensional model of the background while changing a view of the sensor, and then learns the three-dimensional model of the foreground by extracting an area corresponding to the difference with the three-dimensional background model fixed.

(6) The information input apparatus according to the above-mentioned (1), wherein the learning unit previously incorporates knowledge about the three-dimensional foreground and background models and subsequently learns the three-dimensional foreground and background models.

(7) The information input apparatus according to the above-mentioned (1), wherein the learning unit cuts out, from three-dimensional space, a model whose position or posture does not change, as a background, and a target whose position or posture changes frequently, as a foreground model, and learns the foreground and background models.

(8) The information input apparatus according to the above-mentioned (1), wherein the user recognition unit detects, as the user, a foreground model associated with an area obtained by detecting a human or face from an image captured by the observation unit.

(9) The information input apparatus according to the above-mentioned (1), wherein the user recognition unit identifies the fingers by previously labeling the fingers, performing graph matching with the labeled fingers and a three-dimensional model of a typical human body which is prepared after the labeling, and noting a foreground of an area corresponding to the labeled node.

(10) The information input apparatus according to the above-mentioned (1), wherein the user recognition unit identifies a shape of the identified fingers against a typical, three-dimensional hand model which is previously prepared for each hand shape.

(11) The information input apparatus according to the above-mentioned (10), wherein the user recognition unit prepares a different, typical, three-dimensional hand model for each user and changes the typical, three-dimensional hand model in accordance with a user identified on the basis of the observation data.

(12) The information input apparatus according to the above-mentioned (1), wherein the apparatus control unit identifies an apparatus to be controlled on the basis of the identified shape, position, and posture of the hand and then issues a control command corresponding to the identified state of the hand or a change in the state, to the apparatus to be controlled.

(13) The information input apparatus according to the above-mentioned (12), wherein the apparatus control unit refers to a control command correspondence table, the control command correspondence table defining type-specific correspondences between shapes of hands and control commands, to determine a control command from the user corresponding to the identified state of the hand or a change in the state.

(14) The information input apparatus according to the above-mentioned (13), wherein the apparatus control unit uses the control command correspondence table where the type-specific correspondences are defined for each apparatus to be controlled.

(15) The information input apparatus according to the above-mentioned (1), wherein when the user makes a pointing motion where an index finger is raised, the apparatus control unit identifies a foreground model present on a line extending from a tip of the index finger, as an apparatus to be controlled.

(16) The information input apparatus according to the above-mentioned (1), wherein the apparatus control unit determines a control command corresponding to a combination of respective states of left and right hands of the user or a combination of changes in the states.

(17) The information input apparatus according to the above-mentioned (1), wherein when the apparatus control unit recognizes a display as an apparatus to be controlled, the apparatus control unit outputs a control command corresponding to a cursor operation on a screen of the display.

(18) The information input apparatus according to the above-mentioned (17), wherein the apparatus control unit specifies a three-dimensional motion speed of a cursor position on the screen on the basis of the amount of displacement from a starting position of a finger-pointing motion.

(19) The information input apparatus according to the above-mentioned (17), wherein the apparatus control unit obtains an intersection of straight lines extending from the identified fingers of both hands of the user and specifies a depth to a three-dimensional user interface on the screen on the basis of the intersection.

(20) The information input apparatus according to the above-mentioned (1), wherein the apparatus control unit recognizes an apparatus to be controlled and an instruction to be issued to the apparatus to be controlled, on the basis of an intersection of a posture of the recognized pointing fingers of the user and an object in the environment.

(21) The information input apparatus according to the above-mentioned (1), wherein the apparatus control unit recognizes an apparatus to be controlled on the basis of an intersection of a posture of the recognized fingers of one hand of the user and an object in the environment, as well as recognizes an instruction to be issued to the apparatus to be controlled on the basis of a shape of the recognized fingers of the other hand of the user or a change in a position and posture of the fingers of the other hand and outputs a control command.

(22) A method for inputting information, including observing an environment including a user and one or more apparatuses to be controlled; separating a foreground and a background from observation data obtained in the observing step, the foreground including the user and the one or more apparatuses to be controlled, the background including the environment except for the foreground, and learning three-dimensional models of the foreground and the background; estimating positions and postures of already modeled foregrounds in the environment; identifying fingers of the user from the foreground and recognizing a shape, position, and posture of the fingers; and outputting a control command to the one or more apparatuses to be controlled on the basis of the shape, position, and posture of the fingers recognized in the identifying step.

(23) A computer program written in computer-readable form to cause a computer to function as: an observation unit configured to observe an environment including a user and one or more apparatuses to be controlled, the observation unit including a sensor; a learning unit configured to separate a foreground and a background from observation data obtained by the observation unit, the foreground including the user and the one or more apparatuses to be controlled, the background including the environment except for the foreground, and to learn three-dimensional models of the foreground and the background; a state estimation unit configured to estimate positions and postures of already modeled foregrounds in the environment; a user recognition unit configured to identify fingers of the user from the foreground and to recognize a shape, position, and posture of the fingers; and an apparatus control unit configured to output a control command to the one or more apparatuses to be controlled on the basis of the shape, position, and posture of the fingers recognized by the user recognition unit.

The present disclosure contains subject matter related to that disclosed in Japanese Priority Patent Application JP 2012-072392 filed in the Japan Patent Office on Mar. 27, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information input apparatus comprising:
an observation unit configured to observe an environment including a user and one or more apparatuses to be controlled, the observation unit including a sensor;
a learning unit configured to separate a foreground and a background from observation data obtained by the observation unit, the foreground including the user and the one or more apparatuses to be controlled, the background including the environment except for the foreground, and to learn three-dimensional models of the foreground and the background;
a state estimation unit configured to estimate positions and postures of already modeled foregrounds in the environment;
a user recognition unit configured to identify fingers of the user from the foreground and to recognize a shape, position, and posture of the fingers; and
an apparatus control unit configured to:
  specify a depth to a three-dimensional user interface on a display, of an apparatus of the one or more apparatuses, based on an intersection of straight lines extending from the identified fingers of the user, and
  output a control command to the one or more apparatuses to be controlled on the basis of the depth, shape, position, and posture of the fingers recognized by the user recognition unit.

2. The information input apparatus according to claim 1, wherein the observation unit is configured to obtain a range image of the environment, and
wherein the learning unit is configured to separate the foreground and the background from the range image and learn the three-dimensional models of the foreground and the background.

3. The information input apparatus according to claim 1, wherein the learning unit is configured to previously construct a three-dimensional model of a desired apparatus to be controlled before the user actually controls or operates the desired apparatus to be controlled.

4. The information input apparatus according to claim 3, wherein the learning unit is configured to construct a three-dimensional model of an ambient environment that includes the desired apparatus to be controlled, then eliminate the desired apparatus to be controlled from the ambient environment, and construct a three-dimensional model of only the desired apparatus to be controlled by detecting a three-dimensional model corresponding to a difference.

5. The information input apparatus according to claim 1, wherein the state estimation unit is configured to:
update the three-dimensional models, of the foreground and background, which have already been constructed by the learning unit;
continue to estimate respective positions and postures of the sensor and the foreground;
construct the three-dimensional model of the background while changing a view of the sensor; and learn the three-dimensional model of the foreground by extracting an area corresponding to a difference with the three-dimensional background model fixed.

6. The information input apparatus according to claim 1, wherein the learning unit is configured to previously incorporate knowledge about the three-dimensional foreground and background models and learn the three-dimensional foreground and background models.

7. The information input apparatus according to claim 1, wherein the learning unit is configured to:
cut out, as the background, a model whose position or posture does not change in three-dimensional space;
cut out, as a foreground model, a target whose position or posture changes frequently; and
learn the foreground and background models.

8. The information input apparatus according to claim 1, wherein the user recognition unit is configured to detect, as the user, a foreground model associated with an area obtained by detecting a human or face from an image captured by the observation unit.

9. The information input apparatus according to claim 1, wherein the user recognition unit is configured to:
identify the fingers by previously labeling the fingers;
perform graph matching with the labeled fingers and a three-dimensional model of a typical human body which is prepared after the labeling; and
note a foreground of an area corresponding to the labeled node.

10. The information input apparatus according to claim 1, wherein the user recognition unit is configured to identify a shape of the identified fingers against a typical, three-dimensional hand model which is previously prepared for each hand shape.

11. The information input apparatus according to claim 10, wherein the user recognition unit is configured to prepare a different, typical, three-dimensional hand model for each user and change the typical, three-dimensional hand model in accordance with the user identified on the basis of the observation data.

12. The information input apparatus according to claim 1, wherein the apparatus control unit is configured to identify an apparatus to be controlled on the basis of an identified shape, position, and posture of the hand and issue the control command corresponding to an identified state of the hand or a change in the state, to the apparatus to be controlled.

13. The information input apparatus according to claim 12, wherein the apparatus control unit is configured to refer to a control command correspondence table, the control command correspondence table that defines type-specific correspondences between shapes of hands and control commands, to determine a control command from the user corresponding to the identified state of the hand or the change in the state.

14. The information input apparatus according to claim 13, wherein the apparatus control unit is configured to use the control command correspondence table where the type-specific correspondences are defined for each apparatus to be controlled.

15. The information input apparatus according to claim 1, wherein, when the user makes a pointing motion where an index finger is raised, the apparatus control unit is configured to recognize a foreground model present on a line extending from a tip of the index finger, as an apparatus to be controlled.

16. The information input apparatus according to claim 1, wherein, when the apparatus control unit is configured to recognize the display as the apparatus to be controlled, the apparatus control unit is configured to output the control command corresponding to a cursor operation on a screen of the display on the basis of a change in the recognized position and posture of the fingers.

17. The information input apparatus according to claim 16, wherein the apparatus control unit is configured to specify a three-dimensional motion speed of a cursor position on the screen on the basis of an amount of displacement from a starting position of a finger-pointing motion.

18. The information input apparatus according to claim 1, wherein the apparatus control unit is configured to:
recognize an apparatus to be controlled on the basis of the intersection of a posture of the recognized fingers of one hand of the user and an object in the environment;
recognize an instruction to be issued to the apparatus to be controlled on the basis of a shape of the recognized fingers of the other hand of the user or a change in a position and posture of the fingers of the other hand; and
output the control command.

19. A method for inputting information comprising:
observing an environment including a user and one or more apparatuses to be controlled;
separating a foreground and a background from observation data obtained in the observing step, the foreground including the user and the one or more apparatuses to be controlled, the background including the environment except for the foreground, and learning three-dimensional models of the foreground and the background;
estimating positions and postures of already modeled foregrounds in the environment;
identifying fingers of the user from the foreground and recognizing a shape, position, and posture of the fingers;
specifying a depth to a three-dimensional user interface on a display, of an apparatus of the one or more apparatuses, based on an intersection of straight lines extending from the identified fingers of the user; and
outputting a control command to the one or more apparatuses to be controlled on the basis of the depth, shape, position, and posture of the fingers recognized in the identifying step.

20. A non-transitory computer-readable storage medium having stored thereon a set of computer-executable instructions for causing a computer to perform steps of:
observing an environment including a user and one or more apparatuses to be controlled utilizing at least a sensor;
separating a foreground and a background from observation data obtained in the observing step, the foreground including the user and the one or more apparatuses to be controlled, the background including the environment except for the foreground, and to learn three-dimensional models of the foreground and the background;
estimating positions and postures of already modeled foregrounds in the environment;
identifying fingers of the user from the foreground and recognizing a shape, position, and posture of the fingers;
specifying a depth to a three-dimensional user interface on a display, of an apparatus of the one or more apparatuses, based on an intersection of straight lines extending from the identified fingers of the user; and outputting a control command to the one or more apparatuses to be controlled on the basis of the recognized shape, position, and posture of the fingers.

\* \* \* \* \*